United States Patent [19]

Lindow

[11] Patent Number: 4,489,257
[45] Date of Patent: Dec. 18, 1984

[54] DRIVING AND BRAKING SYSTEM FOR ELECTRIC MOTORS

[75] Inventor: Carl E. Lindow, San Jose, Calif.

[73] Assignee: FMC Corporation, Chicago, Ill.

[21] Appl. No.: 541,846

[22] Filed: Oct. 14, 1983

[51] Int. Cl.³ .............................................. H02P 3/10
[52] U.S. Cl. .................................... 318/258; 318/269; 318/273
[58] Field of Search ............... 318/255, 256, 261, 257, 318/258, 268, 269, 273, 280, 281, 287, 296, 300

[56] References Cited

U.S. PATENT DOCUMENTS

| | | | |
|---|---|---|---|
| 3,582,740 | 6/1971 | Reinert | 318/300 X |
| 3,624,475 | 11/1971 | Smith | 318/341 |
| 3,656,039 | 4/1972 | Konard | 318/296 X |
| 4,284,930 | 8/1981 | Matty | 318/269 |
| 4,423,362 | 12/1983 | Konard et al. | 318/296 X |

Primary Examiner—J. V. Truhe
Assistant Examiner—Bentsu Ro
Attorney, Agent, or Firm—Lloyd B. Guernsey; Henry M. Stanley; Richard B. Megley

[57] ABSTRACT

A driving and braking system having solid state switches for use with an electric motor. A first switch in series with a motor armature carries current from a power supply to the motor during the driving operation. A second switch couples a voltage from the motor armature to the first switch to render the first switch nonconductive and place the motor in a braking mode in response to a braking signal. The first switch provides armature current and couples a voltage from the motor armature to the second switch to render the second switch nonconductive and place the motor in a driving mode in response to a driving signal. The motor can be switched between the braking mode and the driving mode without bringing the motor to a stop.

17 Claims, 3 Drawing Figures

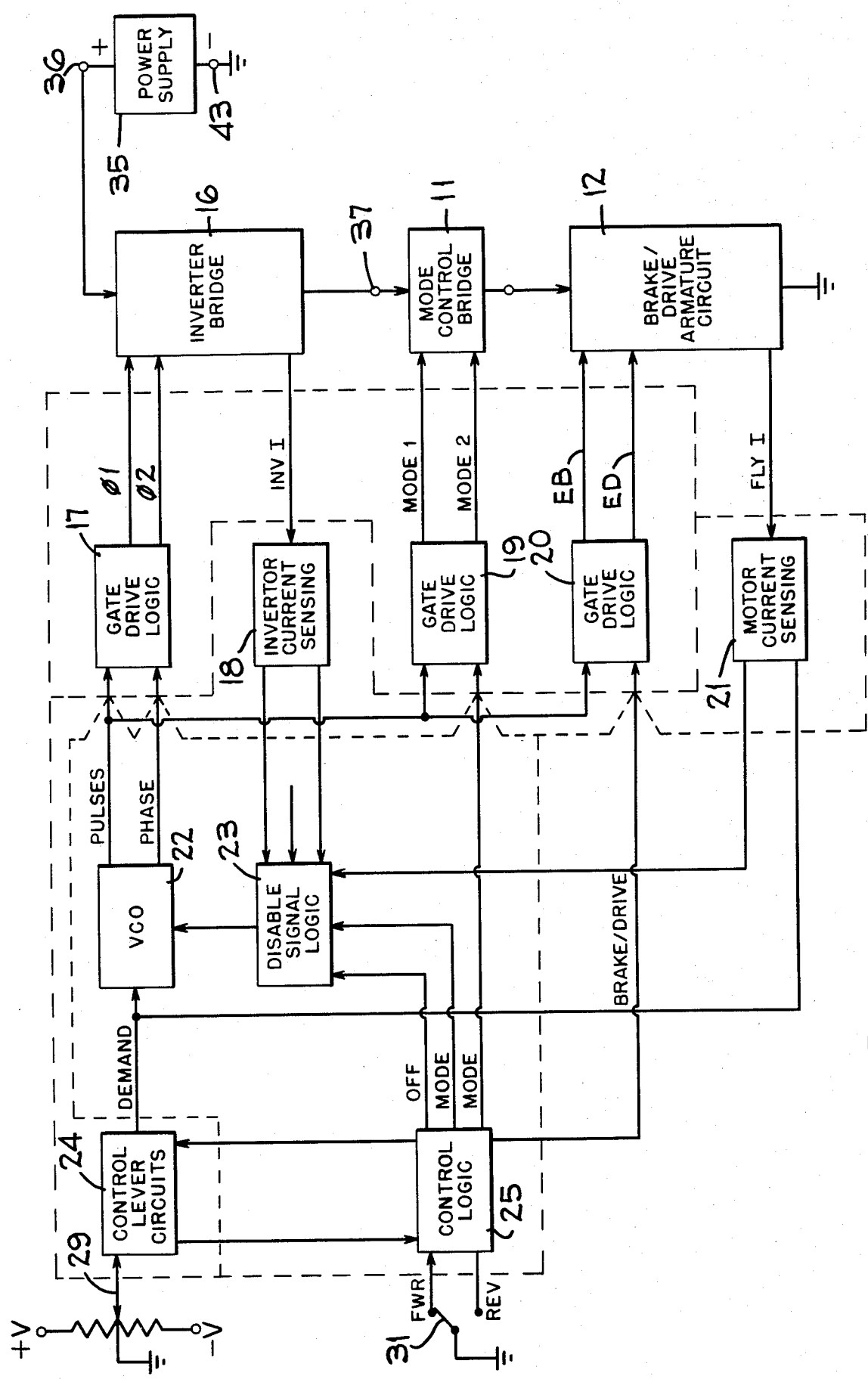
FIG_1

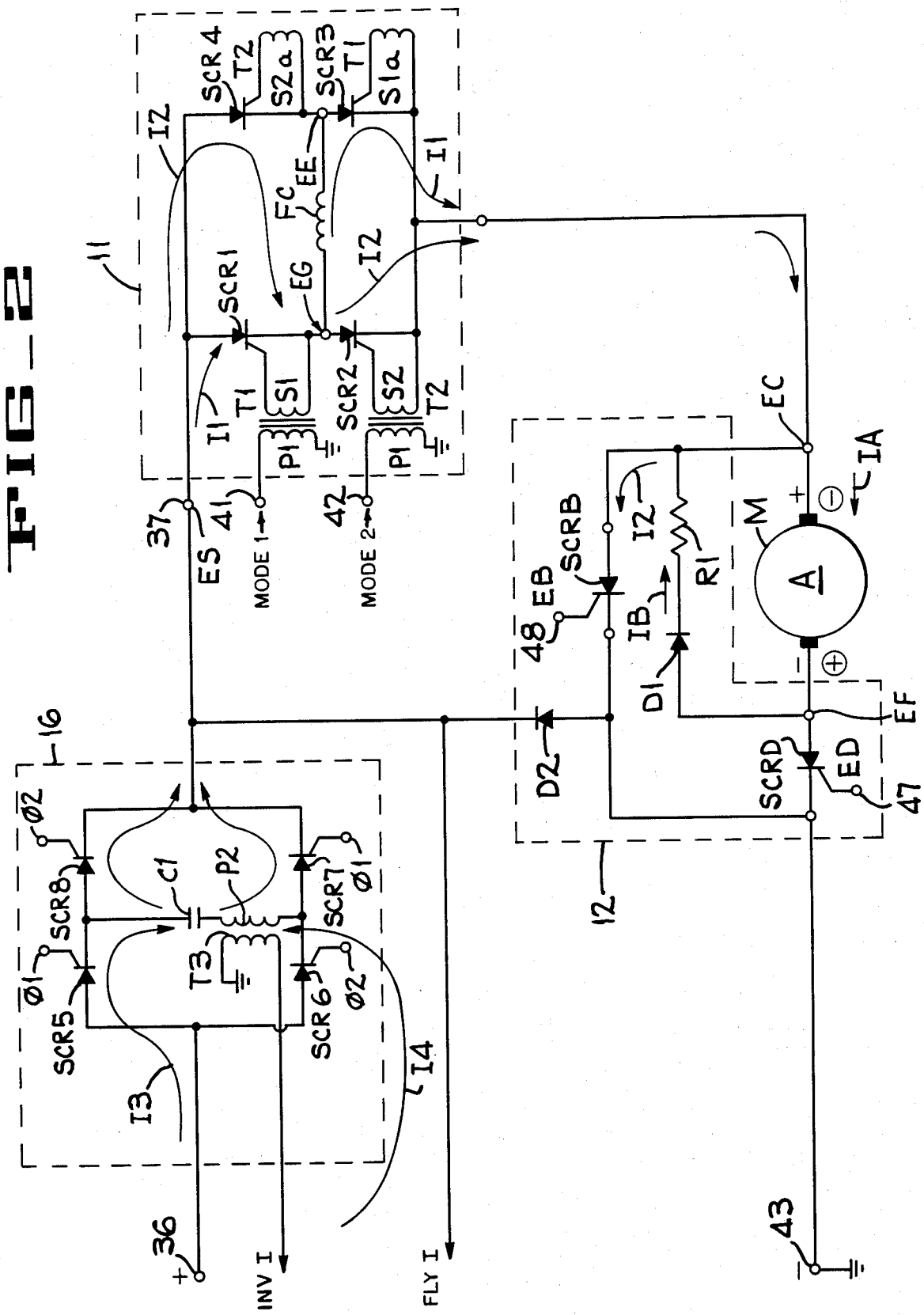
FIG_2

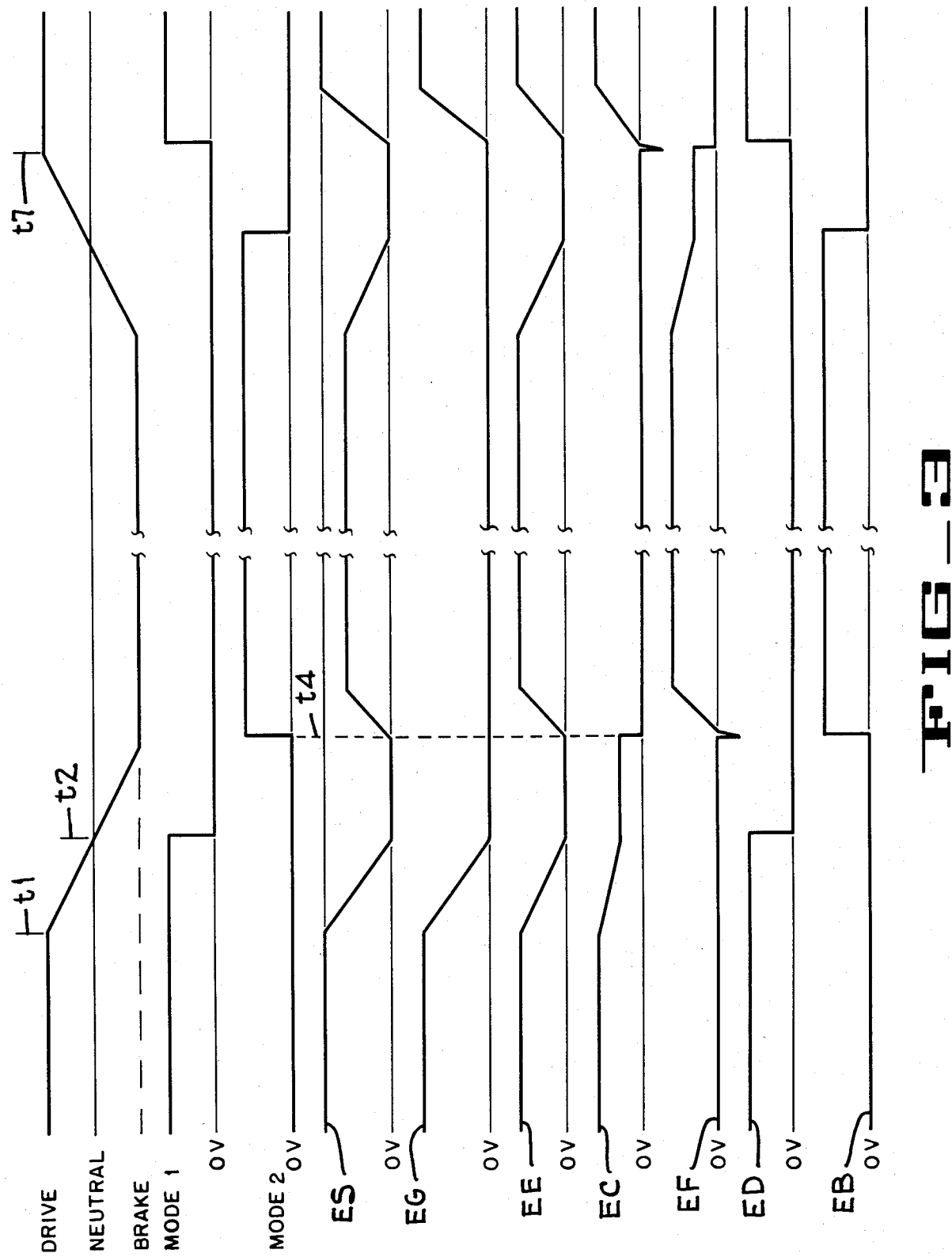
FIG_3

DRIVING AND BRAKING SYSTEM FOR ELECTRIC MOTORS

BACKGROUND OF THE INVENTION

The present invention pertains to a system for controlling an electric motor, and more particularly, to a system for using the E.M.F. across a motor armature to change the connection between a power source and the motor, when it is desired to change the motor between a motoring mode and a braking mode or between a braking mode and a motoring mode without bringing the motor to a stop.

In a variety of industrial applications it is desirable to be able to shift an electrical motor from a motoring (driving) mode to a braking mode and back to a motoring mode without bringing the motor to a complete stop. One such application is a mine portal car for use in underground mining operations, such as coal mining. Here, the car employs one or more electric motors to provide power for moving the car carrying mining personnel from the mine entrance into the mining area where the passengers disembark. Since the path between the loading area and the unloading area may not be level, the car may be accelerated for a time until it starts downhill where the car is then placed in a braking mode. It may then be desirable to accelerate the car again without coming to a stop. This process of accelerating and then braking may be repeated several times between one end of the run and the other end of that run. It is desirable to provide an electrical control circuit to alternately move the electric motor between the motoring mode and the braking mode without using mechanical contactors to carry the electrical current for the motor.

BRIEF DESCRIPTION OF THE DRAWINGS

FIG. 1 discloses a motor control system which can be used to develop motoring and braking signals used with the present invention.

FIG. 2 discloses an embodiment of a circuit of the present invention having solid state components used to change an electrical motor from a motoring mode to a braking mode and back to a motoring mode without stopping the motor.

FIG. 3 discloses waveforms useful in explaining the operation of the braking system of the present invention.

SUMMARY OF THE INVENTION

The present invention comprises a dynamic driving and braking system for controlling the operation of an electric motor having an armature and a field coil, by operating the motor in a drive mode, then changing the motor into a braking mode and back to a drive mode without bringing the motor to a stop. The system uses a solid state control element, such as a first thyristor, to provide driving power from a source of variable power and uses a second thyristor to disable the first thyristor and place the motor in a braking mode. A source of drive signals renders the first thyristor conductive and a source of braking signals renders the second thyristor conductive to remove power from the motor. When the second thyristor is rendered conductive a voltage across the motor causes the first thyristor to be rendered nonconductive. When the first thyristor is again rendered conductive a voltage across the motor causes the second thyristor to be rendered nonconductive.

This system is especially useful in controlling drive motors for portal cars used in mining operation, such as coal mining. In a typical operation, the car is driven forward for a distance, then placed in a braking mode as the car moves down a slope, and the car again placed in a drive mode to move the car further toward a loading or an unloading area. It is desirable to be able to shift the motor back and forth between a driving mode and a braking mode without bringing the motor to a complete stop.

DESCRIPTION OF THE PREFERRED EMBODIMENT

Referring now to the figures of the drawings, FIG. 1 discloses a functional block diagram of a system for controlling electric motors by changing the motors from a running mode to a dynamic braking mode and back to a running mode frequently without the necessity of coming to a complete stop. The novel portions of the control system include a mode control bridge 11 and a brake/drive armature circuit 12 (FIGS. 1, 2). The remaining portions 16-25 of the system of FIG. 1 provide a controlled quantity of power for an electrical motor and develop control signals (FIG. 3) for operating the bridge and armature circuits 11, 12 in response to the positions of a control lever 29, and a forward-/reverse switch 31. A power supply 35 provides DC voltages to operate the bridge and armature circuits 11, 12, to operate the control signal portions 17-25 of the control system, and to run a motor M.

The control lever 29 (FIG. 1) controls the mode of operation of the brake/drive circuit 12 and controls the speed of the motor M (FIG. 2). When the control lever 29 is at ground potential the motor M is in a neutral mode with no power applied, with no drive signals and no braking signals developed in the control system of FIG. 1. When the lever 29 is moved upward the system operates in the drive mode with the power to the motor proportional to the positive voltage coupled from the control lever 29 to control lever circuits 24. The control lever circuits 24 control operation of the voltage controlled oscillator (VCO) 22, with the frequency of the oscillator proportional to the voltage from the control lever 29. The oscillator output is used by the gate drive logic 17 to provide a pair of control signals $\emptyset 1$, $\emptyset 2$ which causes the inverter bridge 16 to control the quantity of current supplied from the power supply 35 to the mode control bridge 11 and to the armature circuit 12, thereby controlling motor speed. The $\emptyset 1$ control signal is 180 degrees out of phase with the $\emptyset 2$ control signal. The amount of current supplied to the armature circuit 12 is proportional to the frequency developed by the oscillator 22.

The motor control lever 29 (FIG. 1) and the forward-/reverse switch 31 provide signals which are used by control logic 25 to generate brake/drive signals, mode signals and to disable the oscillator 22. The gate drive logic 20 uses the brake/drive signals and the VCO pulses to develop a drive signal ED and a brake signal EB to control the brake/drive armature circuit 12. The gate drive logic 19 uses VCO pulses and mode signals from logic circuit 25 to develop Mode 1 and Mode 2 signal for operating the mode control bridge 11 in either a drive or a braking mode. When the forward/reverse switch 31 is in a forward position the mode control bridge 11 operates to provide forward motor drive when a Mode 1 signal is applied to the bridge 11 and operates to provide braking when a Mode 2 signal is applied to the bridge 11. When the forward/reverse switch 31 is in a reverse position the mode control bridge operates to provide reverse motor drive when a Mode 1 signal is applied to the bridge 11 and operates to provide braking when a Mode 2 signal is applied to the bridge 11. The inverter current sensing circuit 18 detects current in the inverter bridge 16 and disables the system if the inverter current exceeds a predetermined value. The motor current sensing circuit 21 detects current in the brake/drive armature circuit 12 and controls the system to prevent the armature current from exceeding a predetermined value.

The inverter bridge 16 (FIGS. 1, 2) uses the $\emptyset 1$ and $\emptyset 2$ signals to route a current I3 from a positive power supply terminal 36 through a pair of thyristors SCR5, SCR7 when the $\emptyset 1$ signal is positive and a current I4 through a pair of thyristors SCR6, SCR8 when the $\emptyset 2$ signal is positive. The amount of current supplied by the inverter bridge 16 to a current input terminal 37 of the mode control bridge 11 is proportional to the frequency of the $\emptyset 1$ and $\emptyset 2$ signals. When the $\emptyset 1$ signal is positive and bridge 11 is conductive, a pulse of current I3 flows from terminal 36 through SCR5 to the upper plate of a capacitor C1, from the lower plate of capacitor C1 through a primary winding P2 and SCR7 to the input terminal 37. When the $\emptyset 2$ signal is positive ($\emptyset 1$ signal is negative) and bridge 11 is conductive, a pulse of current I4 flows from terminal 36 through SCR6 and primary winding P2 to the lower plate of capacitor C1, from the upper plate of capacitor C1 through SCR8 to the input terminal 37. All of the current pulses I3, I4 are substantially the same size, so the more pulses per second the greater the amount of current supplied to terminal 37. A current transformer T3 senses the amount of current flowing from terminal 36 through the inverter bridge 16.

When it is desired to rotate the motor M (FIG. 2) in a forward direction the control lever 29 (FIG. 1) is placed in the drive position (FIG. 3) so the motor control system of FIG. 1 develops the control signals disclosed in FIG. 3 prior to the time t1. The positive value of the Mode 1 signal renders thyristors SCR1 and SCR3 conductive and the ED signal renders the thyristor SCRD conductive. The current I1 flows from the input terminal 37 through the thyristor SCR1, through the field coil FC, through thyristor SCR3, through the armature A of the motor M and the thyristor SCRD to a negative terminal 43 of the power supply 35. The current through the field coil FC and through the armature A causes the motor M to rotate in a forward direction. Since thyristor SCR1 is conductive the voltage EG (FIG. 2) is substantially the same as the input voltage ES (FIG. 3) between times t1 and t2, and the voltage EE is slightly less than the voltage EG by the amount of the voltage drop across coil FC. Since SCR3 is conductive the voltage EC (FIGS. 2, 3) is substantially the same as voltage EE. Since thyristor SCRD is conductive, prior to time t1 the voltage EF has a value of substantially zero.

As the control lever 29 (FIG 1) is moved from the drive position toward the neutral position, between time t1 (FIG. 3) and time t2, the frequency of the output from the voltage controlled oscillator 22 (FIG. 1) decreases causing the inverter bridge 16 to decrease the voltage ES at terminal 37 (FIG. 2) to a value of zero (FIG. 3) when the control lever reaches the neutral position at time t2. Shortly after time t2 the control lever 29 (FIG. 1) is moved downward to apply a negative voltage to control lever circuit 24 (as shown in the drive/brake waveform FIG. 3), the Mode 1 voltage on a signal input terminal 41 of the mode control bridge 11 (FIG. 2), and the control voltage ED on a control terminal 47 of SCRD, both reach a value of zero. The rotating armature causes current IA to continue to flow through the motor armature A and the thyristor SCRD where it is diverted through a diode D2 and through the mode control bridge 11. The thyristor SCRD continues to conduct as the current through this thyristor is still above the minimum current value needed to keep it conductive. When voltage ES decreases to a value of zero at time t2, voltages EG and EE also decrease to zero because thyristors SCR1 and SCR3 are conductive.

The motor M (FIG. 2) is moved into a dynamic braking mode at time t4 (FIG. 3) by applying a positive voltage EB (FIG. 2) to a control terminal 48 of a braking thyristor SCRB thereby rendering SCRB conductive. The conducting SCRB applies the motor armature voltage across the drive thyristor SCRD with a negative voltage on the anode of SCRD and a positive voltage on the cathode to provide a negative pulse of voltage EF (FIG. 3) at time t4. This armature voltage renders the thyristor SCRD nonconductive and disconnects the motor armature A from the power supply terminal 43. A positive value of Mode 2 signal on input terminal 42 (FIG. 2) causes thyristors SCR2, SCR4 to be rendered conductive so a current I2 flows through the field coil FC in a reverse direction relative to the previous field coil current I1. The reverse current I2, through the field coil reverses the polarity of voltage across the motor armature to the voltage polarity shown in the circles. The circled armature voltage causes a braking current IB to flow through a diode D1 and a resistor R1 to provide dynamic braking for the motor M. The current I2 flows from terminal 37 through SCR4, through the field coil FC, through SCR2 and the braking thyristor SCRB to the negative terminal 43 of the power supply. This dynamic braking mode can be used for long periods of time, such as, during the time a mining car is moving down a long slope.

When the control lever 29 (FIG. 1) is again moved into the drive position, the Mode 1 signal (FIG. 3) is again applied to input terminal 41 (FIG. 2) and the drive signal ED is applied to the control terminal 47 of the drive thyristor SCRD at time t7 to render SCRD conductive. The conducting SCRD applies the circle polarity of armature A to the thyristor SCRD. A negative polarity of voltage on the anode and a positive polarity of voltage on the cathode renders SCRB nonconductive. Thus, the armature voltage turns off the braking thyristor SCRB.

Regenerative braking can also be used to reduce the speed of the motor M by connecting the diode D1 between the left end (FIG. 2) of the motor armature A and the power supply terminal 36. The resistor R1 can be removed from the circuit. The cathode of diode D1 could be connected to the motor armature A and the anode of diode D1 connected to the terminal 36.

Reversing the position of the forward/reverse switch reverses the polarity of the Mode 1 and Mode 2 signals disclosed in FIG. 3. This causes the Mode 1 signal to provide motor drive in either of the motor rotational directions, and causes the Mode 2 signal to provide motor braking in either of the rotational directions as described above.

Thus, the present invention includes a drive/brake armature circuit which provides a variable drive current to a series motor when the circuit is in a drive mode and provides dynamic braking of the motor when the circuit is in a braking mode. A drive thyristor provides a path for motor current while the circuit is in a drive mode. The voltage across the motor armature turns off the drive thyristor when a braking thyristor is rendered conductive by a braking mode signal. When the drive thyristor is again rendered conductive by a drive signal, the voltage across the motor turns off the braking thyristor. The motor can be switched back and forth between the drive mode and a braking mode without the necessity of bringing the motor to a complete stop.

Although the best mode contemplated for carrying out the present invention has been herein shown and described, it will be apparent that modification and variation may be made without departing from what is regarded to be the subject matter of the invention.

What is claimed is:

1. A dynamic driving and braking system for controlling operation of an electric motor having an armature and a field coil, said system for use with a source of drive signals, a source of brake signals, and a source of variable power having first and second power terminals, said system comprising:
   first and second thyristors each having a pair of current terminals and a control terminal;
   means for connecting said field coil between said first power terminal and a first end of said motor armature;
   means for connecting a first current terminal of said first thyristor to a second end of said motor armature;
   means for connecting a second current terminal of said first thyristor to said second power terminal;
   means for connecting a first current terminal of said second thyristor to said first end of said motor armature;
   means for connecting a second current terminal of said second thyristor to said second power terminal;
   a diode;
   a resistor;
   means for serially connecting said diode and said resistor between said first and said second ends of said motor armature;
   means for connecting said source of drive signals to said control terminal of said first thyristor;
   means for connecting said source of brake signals to said control terminal of said second thyristor; and
   means for reversing the field coil connections between said first power terminal and said first end of said motor armature to reverse the polarity of voltage across said motor armature and provide dynamic braking for said motor.

2. A dynamic system as defined in claim 1 including means for applying drive signals to said control terminal of said first thyristor to provide a connection for conducting current through said motor armature to said second power terminal.

3. A dynamic system as defined in claim 1 including means for applying brake signals to said control terminal of said second thyristor to render said second thyristor conductive and divert current around said motor armature.

4. A dynamic system as defined in claim 3 wherein said conductive second thyristor applies a voltage to said first current terminal of said first thyristor causing said first thyristor to be rendered nonconductive.

5. A dynamic system as defined in claim 1 wherein said diode and said resistor provide a path for dynamic braking current through said motor armature when said first thyristor is rendered nonconductive.

6. A dynamic system as defined in claim 5 wherein conduction of current through said first thyristor causes said motor armature to apply a voltage to said first and said second current terminals of said second thyristor causing said second thyristor to be rendered nonconductive.

7. A dynamic system as defined in claim 1 wherein reversing said field coil connections reverses the direction of a current through said field coil to reverse the polarity of voltage across said motor armature.

8. A dynamic driving and braking system for controlling operation of an electric motor having an armature and a field coil, said system for use with a source of drive/brake signals, a source of first and second mode signals, and a source of variable power having first and second power terminals, said system comprising:
   a mode control bridge having first and second current terminals, first and second signal terminals and first and second coil terminals, said field coil being connected between said first and said second coil terminals, said signal terminals being connected to said source of first and second mode signals;
   means for connecting said first current terminal of said bridge to said first power terminal;
   means for connecting said second current terminal of said bridge to a first end of said motor armature;
   first and second thyristors each having a pair of current terminals and a control terminal;
   means for connecting a first current terminal of said first thyristor to a second end of said motor armature;
   means for connecting a second current terminal of said first thyristor to said second power terminal;
   means for connecting a first current terminal of said second thyristor to said first end of said motor armature;
   means for connecting a second current terminal of said second thyristor to said second power terminal; and
   means for connecting said source of drive/brake signals to said control terminals of said first and said second thyristors.

9. A dynamic system as defined in claim 8 including means for applying drive signals to said control terminal of said first thyristor to provide a connection for conducting current through said motor armature to said second power terminal.

10. A dynamic system as defined in claim 8 including means for applying brake signals to said control terminal of said second thyristor to render said second thyristor conductive and divert current around said motor armature.

11. A dynamic system as defined in claim 10 wherein said conductive second thyristor applies a voltage to said first current terminal of said first thyristor causing said first thyristor to be rendered nonconductive.

12. A dynamic system as defined in claim 8 including a diode and a resistor, said diode and said resistor being serially connected between said first and said second ends of said motor armature to provide a path for dynamic braking current through said motor armature when said first thyristor is rendered nonconductive.

13. A dynamic system as defined in claim 12 wherein conduction of current through said first thyristor causes said motor armature to apply a voltage to said first and said second current terminals of said second thyristor causing said second thyristor to be rendered nonconductive.

14. A dynamic system as defined in claim 8 wherein said power source includes a source of DC voltage and an inverter bridge, said bridge having first and second current terminals, and first and second phase input terminals for receiving signals to control the quantity of current from said current terminals, said first current terminal of said inverter being connected to said source of DC voltage, said second current terminal of said inverter bridge being connected to said first current terminal of said mode control bridge.

15. A dynamic system as defined in claim 8 wherein said mode control bridge includes means for reversing a current through said field coil in response to said first and said second mode signals on said first and said second signal terminals.

16. A dynamic driving and braking system for controlling operation of an electric motor having an armature and a field coil, said system for use with a source of variable frequency trigger signals, a source of drive/brake signals, a source of forward/reverse signals and a power supply having first and second output terminals, said system comprising:
  an inverter bridge having first and second current terminals and first and second phase input terminals, said source of trigger signals being connected to said inverter bridge input terminals;
  a mode control bridge having first and second current terminals, first and second signal terminals and first and second coil terminals, said field coil being connected between said first and said second coil terminals, said signal terminals being connected to said source of forward/reverse signals;
  means for connecting said first current terminal of said inverter bridge to said first power supply terminal;
  means for connecting said second current terminal of said inverter bridge to said first current terminal of said control bridge;
  means for connecting said second current terminal of said control bridge to a first end of said motor armature;
  first and second thyristors each having a pair of current terminals and a control terminal;
  means for connecting a first current terminal of said first thyristor to a second end of said motor armature;
  means for connecting a second current terminal of said first thyristor to said second power supply terminal;
  means for connecting said first current terminal of said second thyristor to said first end of said armature and said second current terminal of said second thyristor to said second power supply terminal; and
  means for selectively connecting said drive/brake signals to said control terminals of said first and said second thyristor.

17. A dynamic system as defined in claim 16 wherein said mode control bridge includes means for reversing a current through said field coil in response to said forward/reverse signals on said first and said second signal terminal.

* * * * *